United States Patent [19]

Suh

[11] Patent Number: 5,662,792

[45] Date of Patent: Sep. 2, 1997

[54] WATER PURIFIER HAVING REINFORCEMENT PREVENTING DEFORMATION OF A TANK-SUPPORTING WALL

[75] Inventor: Sang-Wook Suh, Songtan, Rep. of Korea

[73] Assignee: Samsung Electronics Co., Ltd., Suwon, Rep. of Korea

[21] Appl. No.: 556,095

[22] Filed: Nov. 9, 1995

[30] Foreign Application Priority Data

Nov. 14, 1994 [KR] Rep. of Korea .................. 94-30241 U

[51] Int. Cl.$^6$ .................................................. B01D 27/08
[52] U.S. Cl. ........................... 210/104; 210/232; 210/250; 210/257.1; 210/282
[58] Field of Search ............................ 210/103, 104, 210/232, 249, 250, 257.1, 282, 323.2, 416.3

[56] References Cited

U.S. PATENT DOCUMENTS

| | | | |
|---|---|---|---|
| 2,110,318 | 3/1938 | Baruch | 210/249 |
| 3,206,033 | 9/1965 | Kern, Jr. | 210/249 |
| 4,897,187 | 1/1990 | Rice | 210/282 |
| 5,188,727 | 2/1993 | Kurth et al. | 210/282 |
| 5,223,132 | 6/1993 | Yoon | 210/416.3 |
| 5,296,137 | 3/1994 | Gershon et al. | 210/282 |
| 5,397,468 | 3/1995 | Chomka et al. | 210/249 |
| 5,401,399 | 3/1995 | Magnusson et al. | 210/282 |
| 5,454,944 | 10/1995 | Clack | 210/257.1 |

*Primary Examiner*—Neil McCarthy
*Assistant Examiner*—Theodore M. Green
*Attorney, Agent, or Firm*—Burns, Doane, Swecker & Mathis, L.L.P.

[57] ABSTRACT

A water purifier includes a body forming a horizontal support surface and a wall projecting upwardly from the support surface. A plurality of filtering members for purifying water are connected to the wall. A water storage tank for storing purified water is seated on the support surface and bears against the wall. A supporting structure supports the filters from beneath to reduce the load applied to the wall. A reinforcing member is connected to the wall for reinforcing the wall against deformation.

3 Claims, 3 Drawing Sheets

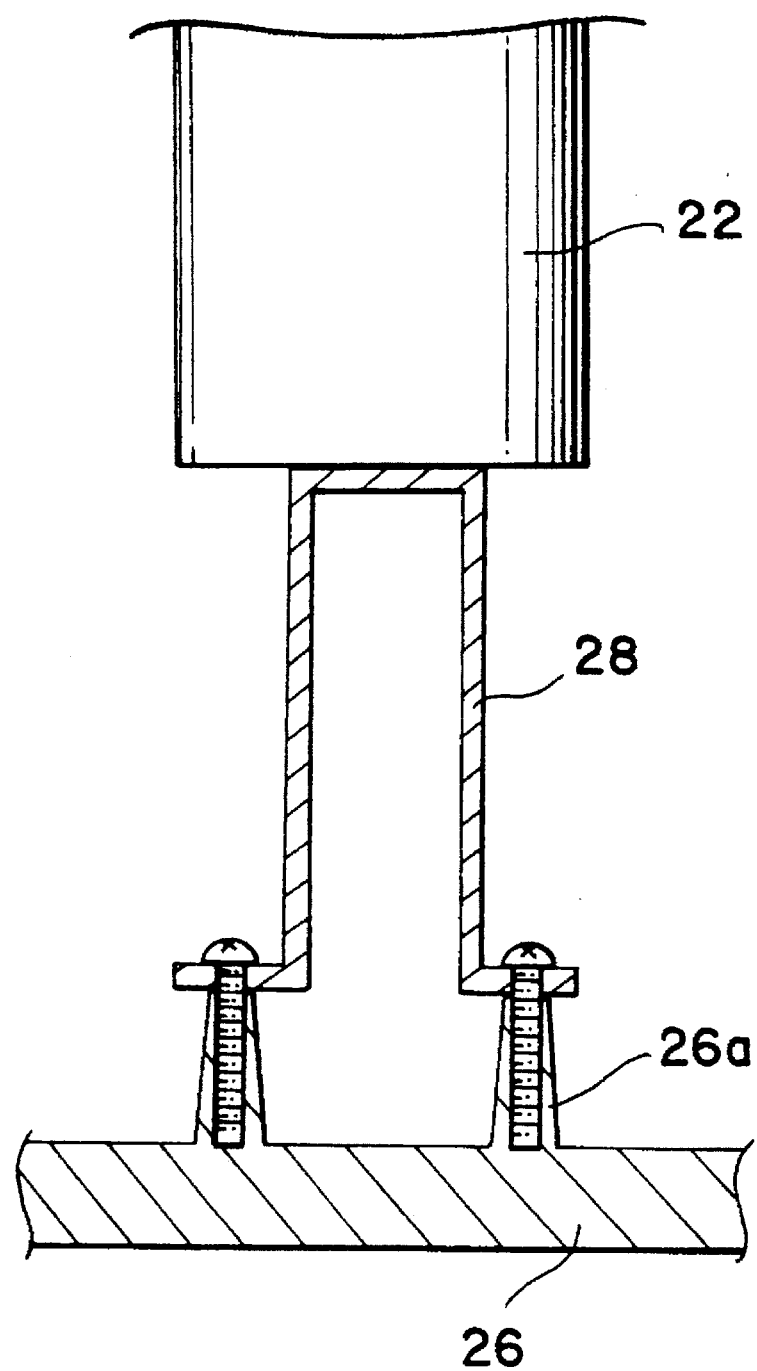

WATER PURIFIER HAVING REINFORCEMENT PREVENTING DEFORMATION OF A TANK-SUPPORTING WALL

BACKGROUND OF THE INVENTION

1. Field of the Invention

The present invention relates to a water purifier for removing harmful materials contained in the potable water to thereby obtain purified water.

2. Description of the Prior Art

Generally, a water purifier is, as illustrated in FIG. 1, mounted at an upper side of a body 1 having a protruding rear wall 1a thereon, with a storage tank 2 for storing purified water, and the body 1 is provided at the rear wall 1a thereof with a plurality of filtering members 6 in order to eliminate various harmful materials contained in the potable water (hereinafter referred to as water) supplied through a water supply pipe 5 connected through the medium of an adapter 4 to a faucet 3.

The filtering members 6 are connected to a purified water pipe 7 for supplying purified water into the storage tank 2, and, at the same time, connected with a discharge pipe 8 for discharging to the adapter 4 concentrated water containing the harmful materials.

Accordingly, the water supplied through the water supply pipe 5 from the faucet 3 passes through the filtering members 6 to thereby be separated from various pollution-containing materials harmful to human body, and is stored in the storage tank 2 through the purified water pipe 7.

The concentrated water containing polluted materials which has not passed through the filtering member 6 is drained out through the discharge pipe 8 to therafter be dropped underneath the adapter 4.

The purified water stored in the storage tank 2 is kept at a predetermined appropriate level by way of a water level detecting sensor (not shown).

However, there is a problem in the conventional water purifier in that the plurality of filtering members arranged at the rear wall of the boby thereof tend to deflect the rear wall toward a rear side thereof because of the heavy weight of the plurality of filtering members, to thereby cause an electrical malfunction or erroneous contact between the water level detecting sensor attached to the storage tank and connecting terminals mounted at the rear wall thereof, so that the appropriate water level of the stored purified water in the storage tank cannot be maintained, and worse yet, the purified water can overflow the storage tank due to continued supply of the purified water.

SUMMARY OF THE INVENTION

The present invention has been disclosed to solve the aforementioned problem and it is an object of the present invention to provide a water purifier for being arranged with a reinforcement at a rear wall of a body thereof where deflection load is applied by filtering members, to thereby prevent deflection at the rear wall, and, at the same time, to enable an exact detection of the purified water level in the storage tank by way of a sure contact of the water level detecting sensor for prevention of overflow of the purified water.

The water purifier according to the present invention employs a body, a purified water tank disposed within the body and filtering members for removing harmful materials contained in the water, the improvement comprising:

a reinforcing member fixedly coupled to a rear wall extensively formed at the body; and a supporting member fixedly coupled to a base member in order to support the filtering members.

The water purifier thus constructed serves to minimize the amount of load transferred by the plurality of filtering members by way of the reinforcing member and the supporting member, to thereby prevent deflection of the rear wall, so that detection by the water level detecting sensor is accurately realized to prevent overflow of the purified water and erroneous operation, and to enable a predetermined appropriate maintenance of water level for comfortable use thereof.

BRIEF DESCRIPTION OF THE DRAWINGS

Other objects and aspects of the invention will become apparent from the following description of embodiment with reference to the accompanying drawings in which;

FIG. 3 is a fragmentary sectional view for illustrating a supporting member of the invention.

DETAILED DESCRIPTION OF THE PREFERRED EMBODIMENT OF THE INVENTION

The preferred embodiment of the present invention will now be described in detail with reference to FIGS. 2 and 3.

Figure 1:
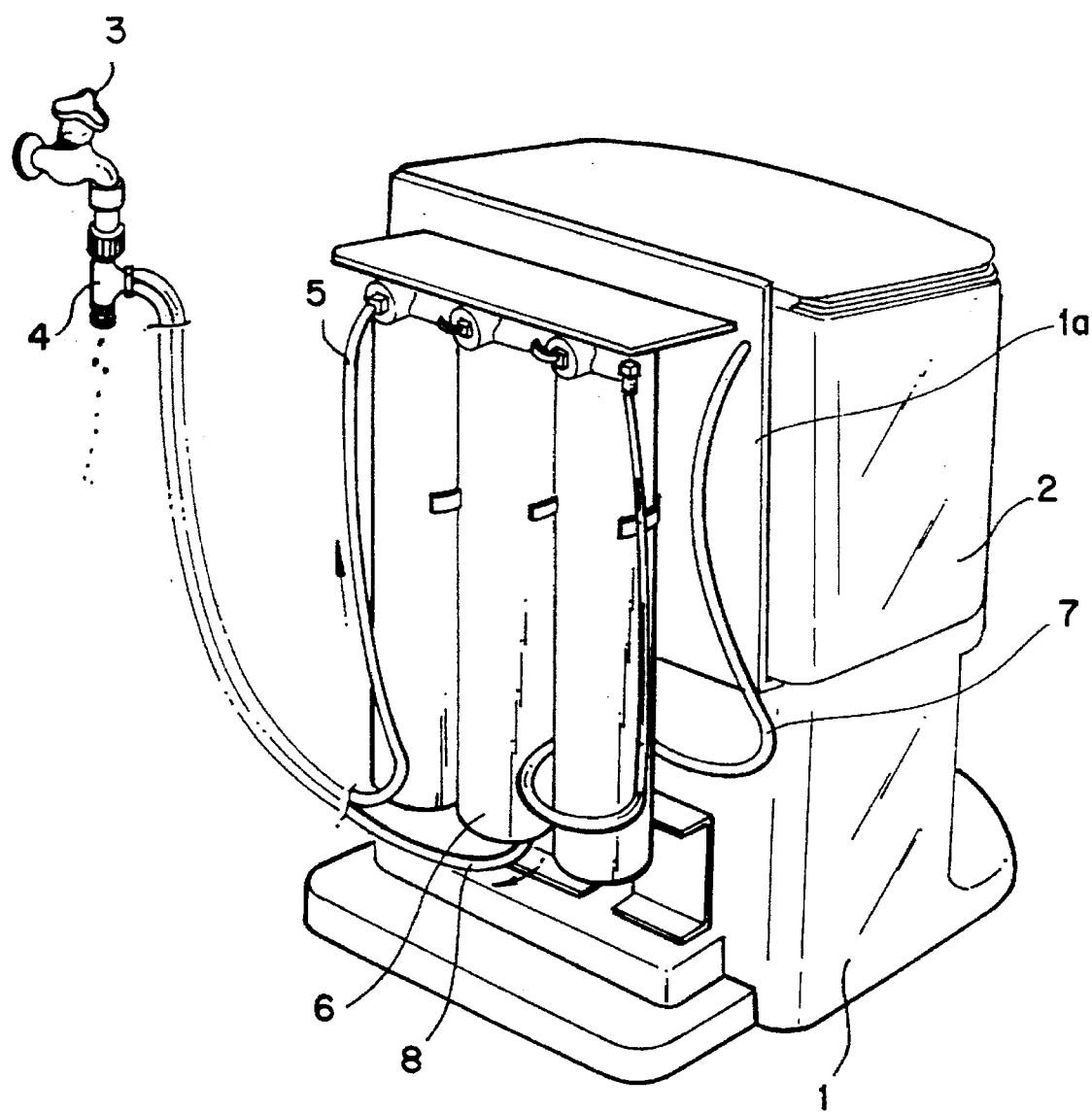
FIG. 1 is a rear perspective view of a conventional water purifier.
Figure 2:
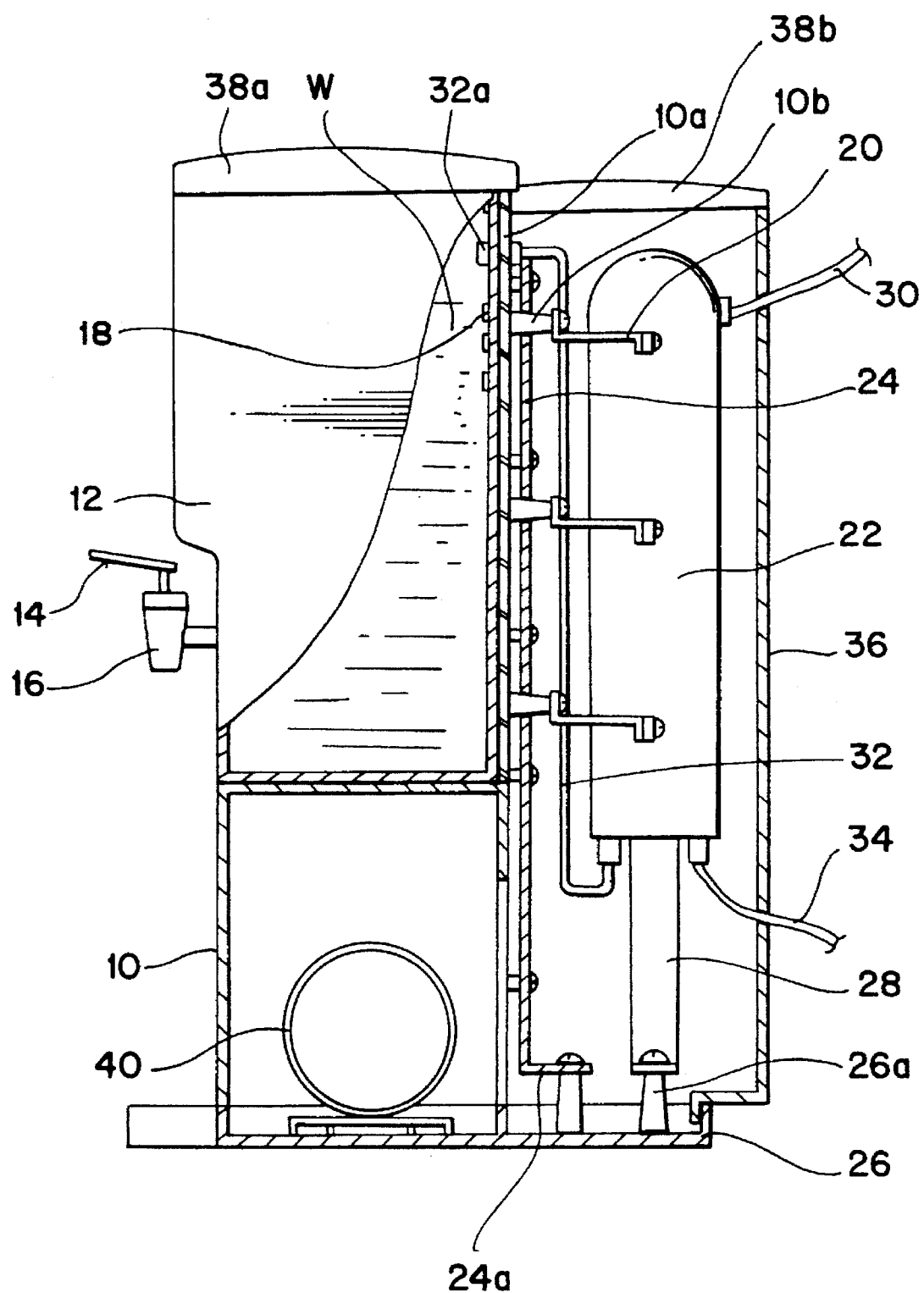
FIG. 2 is a partially cutaway vertical sectional view of a water purifier according to the present invention.

Referring to FIGS. 2 and 3, reference numeral 10 represents a body having an upwardly extending rear wall 10a and the body 10 releasably carries at an upper side thereof a purified water tank 12 for storing the purified water (W) therein.

The tank 12 is coupled at a front side thereof to a disposal outlet 16 for being opened and closed according to manipulation of a lever 14, so that disposal of the purified water (W) can be possible.

In addition, the tank 12 is provided interiorly thereof with a plurality of water level detecting the sensors 18 for detecting level of the purified water (W).

The rear wall 10a of the body 10 is formed with a filter support structure in the form of a plurality of rearwardly protruding connectors or boss units 10b, and the boss units 10b are fixed to filtering members 22 through the medium of a brackets 20. Also the rear wall 10a is coupled to a reinforcing member 24 having an approximately "L" shaped support portion 24a.

The reinforcing member 24 is fixedly connected at one side thereof to the boss units 10b, and the support unit 24a is fixedly coupled to a boss unit 26a of a base member 26 connected under the body 10.

Meanwhile, under the filtering members 22, an inverted U-shaped supporting unit 28 is connected to the filtering members 22 and fixedly connected to the boss unit 26a.

In addition, an initial one of the filtering members 22 is connected at an upper side of an outer container thereof to a water supply pipe 30 for supplying the water, and, a final one of the filtering members is connected at a lower side thereof to a purified water pipe 32 for supplying the purified water (W) into an infuse hole 32a formed at the storage tank 12. One of the filtering members is connected to a discharge pipe 34 for discharging concentrated (unfiltered) water.

A back cover 36 is coupled to the rear side of the body 10, and reference numerals 38a and 38b designate lids which cover upper sides of the purified water tank 12 and the back cover 36 respectively, and reference numeral 40 is a pressure pump for supplying pressure to the supplied water.

Now, the operation of the water purifier according to the present invention thus constructed will be described.

First of all, the water supplied through the water supply pipe 30 becomes purified when passing through the filtering members 22 and is stored in the purified water tank 12 at a predetermined level through the purified water pipe 32, and, at the same time, the concentrated (unfiltered) water produced at the filtering members 22 is drained out through the discharge pipe 34.

The purified water (W) stored in the purified water tank 12 becomes available for drinking when a disposal outlet 16 is opened by way of the manipulation of a lever 14, and the purified water (W) in the purified water tank 12 is maintained at the predetermined level by the water level detecting sensor 18.

At this time, the sides of the filtering members 22 are supported by the plurality of brackets 20, and, at the same time, their bottoms are supported by the supporting member 28, to thereby minimize the load of the filtering members 22 transferred to the rear wall 10a.

Even though a minimized load of the filtering members 22 is transferred to the rear wall 10a, the rear wall 10a is not affected by the deflection load due to the reinforcing member 24 fixedly coupled to one side thereof, to thereby prevent deflection of the rear wall 10a.

Accordingly, electrical contact of the plurality of water level detecting sensors 18 attached in the purified water tank 12 can be surely maintained by non-deflection of the rear wall 10a, thereby causing the purified water (W) to maintain an appropriate level at all times, so that overflow of the purified water (W) resulting from an inadequate contact of the water level detecting sensors 18 can be prevented.

As apparent from the foregoing, the water purifier according to the present invention can minimize the load transferred by the plurality of filtering members by way of the reinforcing member 24 and the support member 28, to prevent deflection of the rear wall, and, to thereby make it possible to have a sure detection of the water level detecting sensor.

Due to this, the overflow of the purified water or erroneous operation can be prevented, to thereby maintain an appropriate level of purified water at all times.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A water purifier, comprising:
   a housing body including a base member, a horizontal support surface disposed above the base member, and an upwardly extending wall;
   a plurality of filtering members for filtering water, each of the filtering members including an outer container having a water inlet and a water outlet, the filtering members connected to the wall and disposed adjacent a first side of the wall;
   a water storage tank for storing water purified by the filters, the tank being seated on the horizontal support surface and bearing against a second side of the wall;
   a first supporting structure for supporting the outer containers of the filters on the base member;
   a reinforcing member including a plate disposed between the filters and the wall and oriented parallel to the wall, the plate being fixedly connected to the wall for reinforcing the wall against deformation; and
   a second supporting structure comprising connectors affixed to the wall and protruding through the plate, the connectors being connected to the filters at locations above the first supporting structure and being separate from the water inlet and water outlet.

2. The water purifier according to claim 1 wherein the first supporting structure comprises a generally inverted U-shaped member including a generally horizontal portion mounted on the base member.

3. The water purifier according to claim 1 wherein the filtering members are connected to a water source, the water storage tank including a water level detecting means for maintaining a generally constant water level in the tank.

* * * * *